United States Patent [19]
Talbot

[11] Patent Number: 5,799,787
[45] Date of Patent: Sep. 1, 1998

[54] CYLINDRICAL TACKLE BOX WITH ROTATING STORAGE TRAYS

[76] Inventor: Donald P. Talbot, 983 College St., Wenatchee, Wash. 98801

[21] Appl. No.: 788,680

[22] Filed: Jan. 24, 1997

[51] Int. Cl.[6] .................. A01K 97/06; B65D 6/06; B65D 6/12; B65D 6/22
[52] U.S. Cl. ............... 206/315.11; 43/54.1; 220/4.27; 220/4.33; 220/23.83
[58] Field of Search .............. 206/315.11; 220/4.26, 220/4.27, 4.28, 4.33, 4.34, 23.83, 408, 410; 43/54.1, 55

[56] References Cited

U.S. PATENT DOCUMENTS

| | | |
|---|---|---|
| 1,817,562 | 8/1931 | Hodge .................. 206/315.11 |
| 2,604,372 | 7/1952 | Klinglesmith . |
| 2,717,470 | 9/1955 | Holdeman .................. 206/315.11 |
| 2,734,306 | 2/1956 | Holdeman .................. 206/315.11 |
| 2,765,576 | 10/1956 | Kurek . |
| 3,378,134 | 4/1968 | Wilkinson et al. . |
| 3,398,827 | 8/1968 | Laskin . |
| 3,751,845 | 8/1973 | van Leeuwen . |
| 4,505,386 | 3/1985 | Abrahamson . |
| 4,538,862 | 9/1985 | Chandler . |
| 5,062,540 | 11/1991 | Jenkins . |
| 5,337,892 | 8/1994 | Zaffina . |
| 5,386,922 | 2/1995 | Jordan . |
| 5,542,206 | 8/1996 | Lisch .................. 43/54.1 |

*Primary Examiner*—Paul T. Sewell
*Assistant Examiner*—Anthony Stashick
*Attorney, Agent, or Firm*—Christensen, O'Connor Johnson & Kindness P.L.L.C.

[57] ABSTRACT

A tackle box (10) is disclosed that includes a rotatable cover (20), one or more storage trays (30), each having a substantially three-quarter circular periphery, a bottom tray (40), and central shaft (50) for vertically stacking and mounting the storage tray or trays and rotatable cover to the bottom tray. Access to the tackle boxes compartments is made by rotating the cover and/or the storage trays. The side walls of the bottom tray and storage tray or trays in combination with the bottom tray floor and rotatable cover form the exterior surface of the tackle box. the number of storage trays that are included in the tackle box may be varied by changing a point of connection between the central shaft and the bottom tray.

21 Claims, 6 Drawing Sheets

CYLINDRICAL TACKLE BOX WITH ROTATING STORAGE TRAYS

FIELD OF THE INVENTION

The present invention relates generally to a tackle box, and more particularly to a cylindrical tackle box having rotating storage trays.

BACKGROUND OF THE INVENTION

Tackle boxes have long been used to store and transport fishing tackle and other implements. Traditionally, tackle boxes are box-shaped with a hinged lid that can be closed for storage and transport, and opened when access to the tackle is desired. Some drawbacks to conventional tackle boxes include their tendency to permit lures to become tangled into a mass that is dangerous and inconvenient to handle, and an inability to display the contents of the box for rapid selection. Moreover, when opened, traditional tackle boxes are also relatively unstable and suffer from the disadvantage of exposing the entire contents to the elements.

To overcome the problems associated with exposing the entire contents of a tackle box to the elements, tackle boxes have been designed to provide access to selective tackle box compartments. One configuration particularly suited to allow access to different compartments in a tackle box is a tackle box with cylindrical trays. For example, U.S. Pat. No. 2,765,576 to Kurek describes a circular tackle box that includes a tray having compartments which are accessible through an opening in the tray's rotatable cover. Similarly, a two-tiered compartmentalized container having a rotatable core and access provided to each compartmentalized tier through a pair of side doors is described in U.S. Pat. No. 3,378,134 to Wilkinson et al.

Unfortunately, while the cylindrical tackle box designs in Kurek and Wilkinson et al. offer access to multiple compartments, the designs retain some shortcomings common to other tackle boxes. Primarily, the designs only allow access to a single compartment at a time. A tackle box user must therefore constantly rotate the components of the tackle box to access items in different compartments. Moreover, the tackle box designs of Kurek and Wilkinson et al. also suffer from an inability to expand to add additional compartments if required by the user. If additional storage compartments are required, the user is therefore forced to buy an additional or larger tackle box. Accordingly, there remains a need for a tackle box offering the convenience of ready accessibility to a number of compartments within the tackle box, while also allowing the number of compartments in the tackle box to be expanded.

SUMMARY OF THE INVENTION

A tackle box having vertically stackable trays that are independently rotatable about a common central axis is disclosed. The tackle box of the present invention includes a bottom tray, one or more storage trays, a rotatable cover, and a central shaft for aligning and coupling the storage tray or trays and the rotatable cover to the bottom tray. When the tackle box is assembled, the side walls of the bottom tray and the storage tray or trays form a continuous surface defining the exterior of the tackle box.

In accordance with one aspect of the invention, the bottom tray and storage trays are generally cylindrical in shape. The bottom tray of the tackle box has a generally circular periphery. The storage trays and rotatable cover of the tackle box each have a substantially three-quarter circular periphery (i.e., each has an otherwise circular periphery with approximately one-quarter portion deleted). The deleted portion of the rotatable cover and trays allows direct access to any tray within the tackle box. Access to the bottom tray is made by rotating the storage trays and cover to bring the deleted portions into alignment with the desired section of the bottom tray to be accessed. Similarly, access to a storage tray is made by rotating the cover and any storage trays above the storage tray being accessed so as to bring the deleted portion into alignment with the section of the storage tray to be accessed.

In accordance with another aspect of the invention, one or more storage trays may be incorporated in the tackle box. The central shaft is connected to the bottom tray by a shaft receiving means that allows the length that the central shaft extends from the bottom tray to be varied. Varying the connection point of the central shaft to the shaft receiving allows a user to select the number of storage trays that are incorporated in the tackle box. A user may therefore expand the storage capacity of the tackle box as required for different applications.

In accordance with still another aspect of the invention, the storage trays are partitioned into a number of compartments by removable dividers. The dividers allow the storage trays to be partitioned to accommodate variously sized objects.

In accordance with yet another aspect of the invention, the storage trays include a brake tab for limiting the rotation of the tray around the central shaft. The brake tab extends downwardly from the lower surface of each tray floor into the volume defined by the immediately lower tray. When a tray is rotated, the brake tab travels within the inner compartment of the lower tray defined by the lower tray's walls. The brake tab prevents the storage tray from rotating completely around the central shaft. The rotatable cover of the tackle box also includes a brake tab for restraining its travel around the central shaft.

In accordance with still another aspect of the invention, a locking means is provided to fix the rotatable cover and the storage tray or trays in a locked (i.e., nonrotating) position about the central shaft. In a preferred embodiment, the locking means includes a wing nut that may be downwardly tightened about the shaft and cover, thereby applying pressure to the vertically stacked components (i.e., the rotatable cover, the storage tray or trays, and the bottom tray) and fixing the position of the cover and storage tray. The portions of the cover and trays compressed by the tightening of the wing nut further include a friction surface to ensure that the components of the tackle box do not rotate. Preferably, the friction surface is a toothed surface.

In accordance with yet another aspect of the invention, the storage trays and the bottom tray are sized to fit within a bucket. The tackle box may therefore be carried to a desired location in the bucket, which may then be used to hold fish or other equipment.

BRIEF DESCRIPTION OF THE DRAWINGS

The foregoing aspects and many of the attendant advantages of this invention will become more readily appreciated as the same becomes better understood by reference to the following the description, when taken in conjunction with the accompanying drawings wherein.

DETAILED DESCRIPTION OF THE PREFERRED EMBODIMENT

Figure 1A:
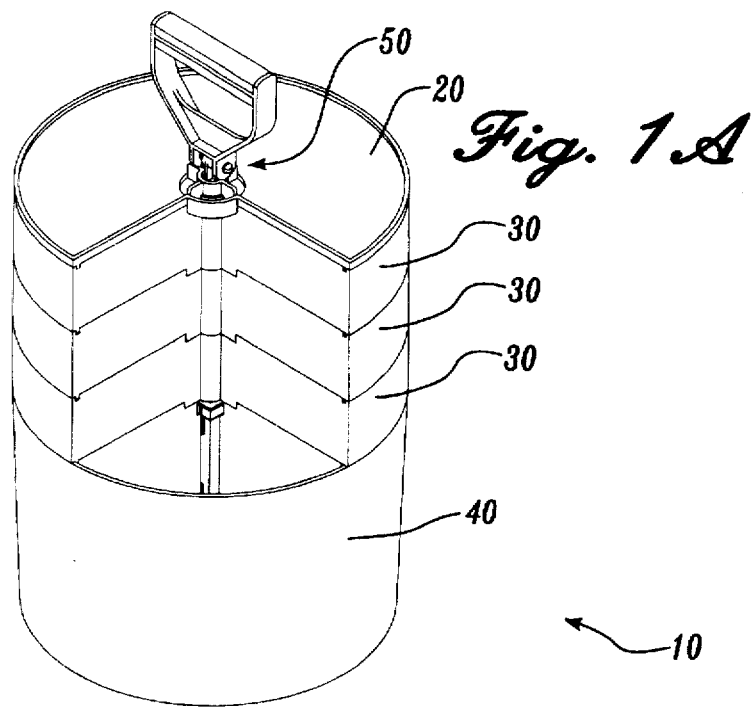
FIG. 1A is a perspective view of a tackle box having three storage trays formed in accordance with the present invention.

FIG. 1A depicts a tackle box 10 formed in accordance with the present invention and having a rotatable cover 20, three storage trays 30, a bottom tray 40, and a central shaft 50. The cover 20 and storage trays 30 are vertically stacked on the bottom tray 40. The central shaft 50 extends through the cover 20, the storage trays 30, and is fixed to the bottom tray 40. As will be appreciated from the following description, the cover and storage trays are allowed to rotate around the central shaft to allow access to the various compartments in the tackle box.

Access to the tackle box compartments is made by rotating the tackle box trays located above the compartment to be accessed. The bottom tray 40 has a generally circular periphery. The cover 20 and storage trays 30 each have a substantially three-quarter periphery (i.e., an otherwise circular periphery with a quarter of their periphery deleted). Access to the top storage tray 30 is achieved by rotating the deleted portion of the cover 20 into a position above the portion of the top storage tray that is to be accessed. Access to any of the storage trays 30 is achieved by rotating the deleted portion of the cover and any higher storage trays to a position over the portion being accessed. Access to the desired portion of the bottom tray 40 is achieved by rotating the cover 20 and all of the storage trays 30 so that their deleted portions are aligned over the portion of the bottom tray to be accessed. Appropriately rotating the tackle box components therefore allows access to all portions of the tackle box.

Figure 1B:
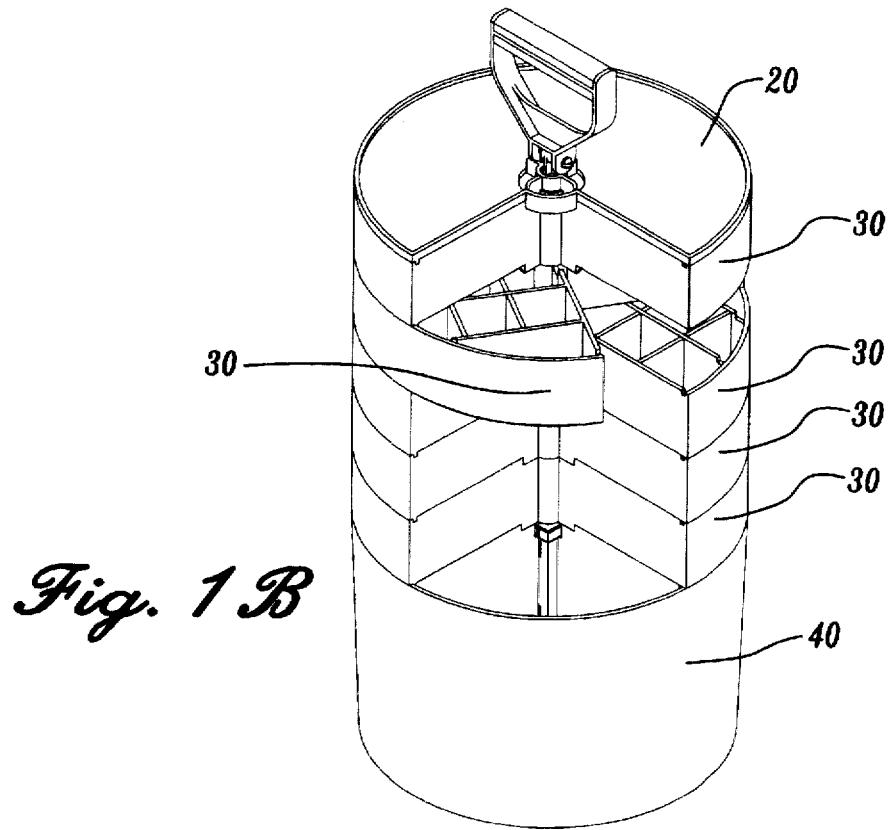
FIG. 1B is a perspective view of a tackle box having five storage trays formed in accordance the present invention.

The tackle box of this invention is modular in that one or more storage trays may be added to the tackle box between the cover 20 and the bottom tray 40. A representative tackle box having three storage trays is shown in FIG. 1A. A representative tackle box having five storage trays is shown in FIG. 1B. Trays may be added or removed from the tackle box in a manner described in additional detail below.

Figure 2:
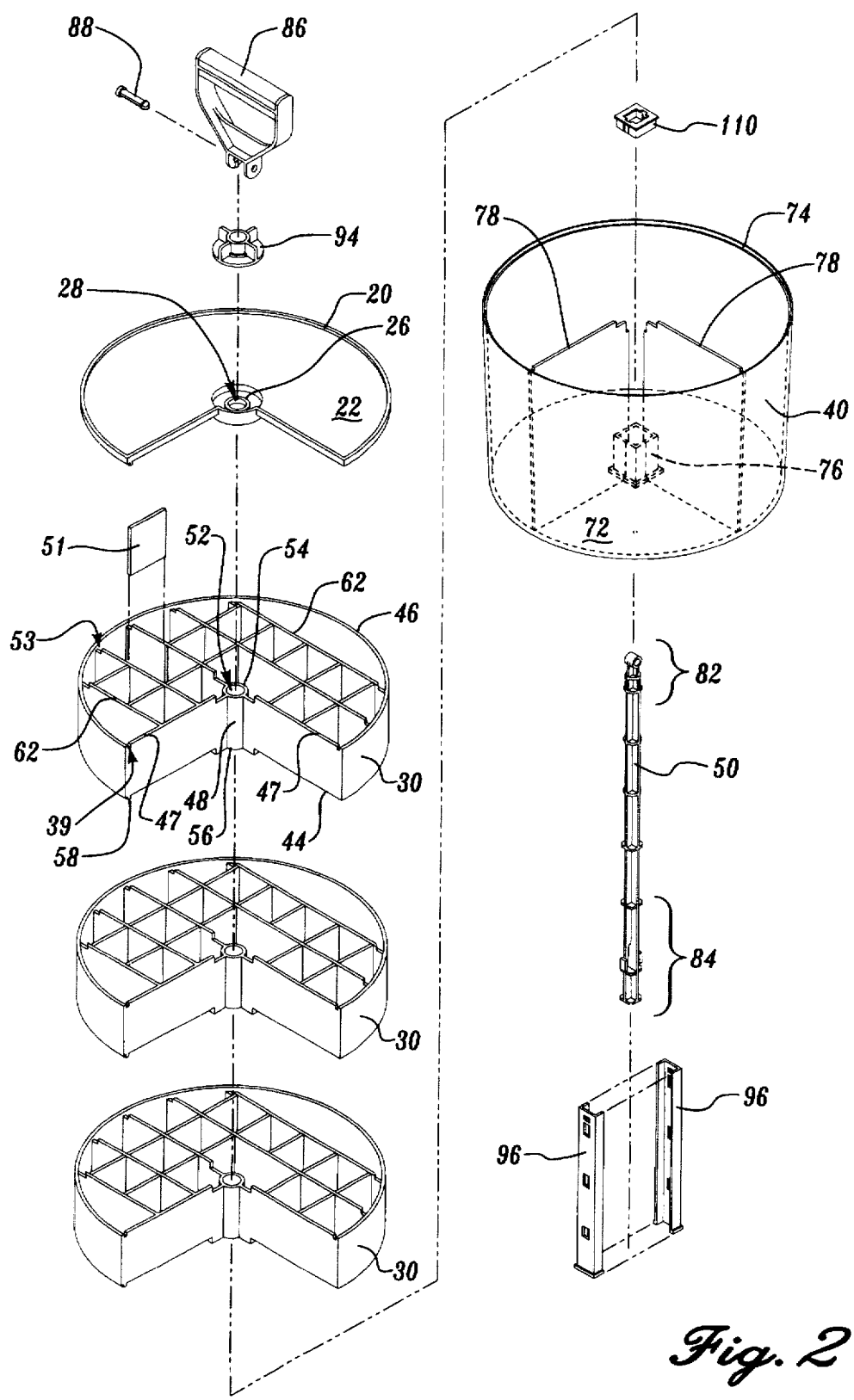
FIG. 2 is an exploded perspective view of the tackle box of FIG. 1A depicting the components of the tackle box including a rotatable cover, three storage trays, and a bottom tray coupled together by a central shaft.

FIG. 2 is an exploded view of the tackle box components that are assembled by the central shaft 50. The rotatable cover 20 is a substantially flat sheet of material having an upper surface 22 and a lower surface 24. Cover 20 includes a central shaft receiving sleeve 26 that is formed with a central aperture 28 for receiving the central shaft 50. The shaft receiving sleeve 26 includes a lower rim 34 that rests upon an upper rim of a shaft receiving sleeve of the storage tray located immediately below the cover when the tackle box is assembled. In one embodiment, the lower rim 34 includes a friction surface, preferably a toothed surface, which locks the position of the cover and the storage tray when compressed against an upper complementary toothed surface of the storage tray.

Figure 3:
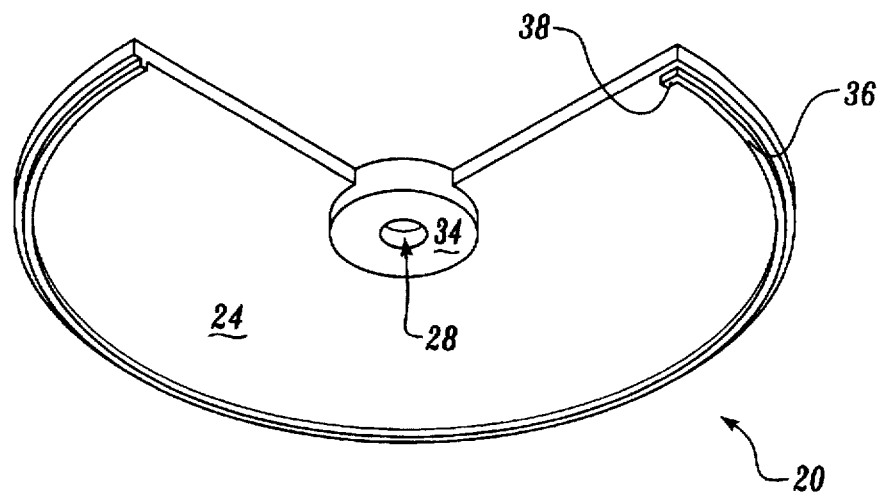
FIG. 3 is a perspective view of the lower surface of the rotatable cover.

As shown in FIG. 3, the cover 20 is constructed with a rib 36 that extends downwardly from the lower surface 24 and is spaced inwardly from the cover's three-quarter circular periphery. When the cover rests on a storage tray, the outward surface of the rib 36 is in slideable communication with the inward surface of the peripheral wall of the storage tray 30. The rib 36 thereby aligns the cover and the storage tray in a vertical stacked arrangement.

Figure 4:
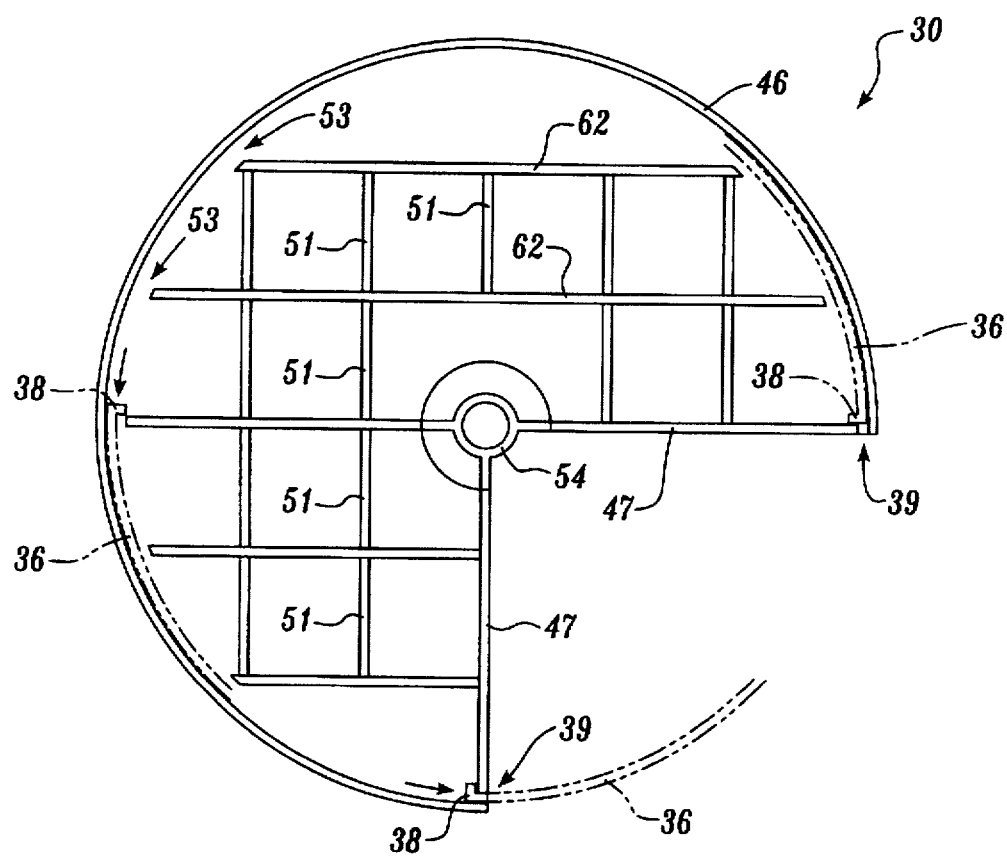
FIG. 4 is a cross section of the tackle box taken parallel with the upper surface of a storage tray and depicting the movement of a brake tab within the storage tray.

In a preferred embodiment, the cover 20 further includes a brake tab 38 that limits the rotation of the cover with respect to the storage tray beneath the cover. The brake tab 38 extends downwardly from the lower surface 24, and is recessed from the periphery of the cover 20 so that the brake tab falls within the volume defined by the peripheral walls of the storage tray beneath the cover when the tackle box is assembled. FIG. 4 depicts a cross section of the tackle box taken in a plane parallel with the upper surface of the storage tray immediately below the cover. The brake tab 38 has a length sufficient to prevent the cover from freely rotating completely around the shaft 50. As shown in FIG. 4, the rotation of the cover causes the brake tab 38 to travel within the lower storage tray 30. The rotation of the cover is halted when the brake tab comes into contact with a pair of radial sidewalls 47 that delimit the deleted portion of the storage tray. Notches 39 are present in the radial sidewalls 47 to allow the rib 36 of the cover to slide around the peripheral walls.

Returning to FIG. 2, each storage tray 30 has a substantially three-quarter circular periphery, and a radius substantially equivalent to cover 20. The storage tray 30 includes a floor 44 and a peripheral sidewall 46 that is integrally connected to the floor and extends upwardly around the outer circumference of the tray. The storage tray 30 also includes a central shaft receiving sleeve 48 having a height substantially equivalent to the peripheral sidewall 46. The receiving sleeve 48 is connected to the peripheral sidewall 46 by the pair of radial sidewalls 47, which define the deleted portion of the tray.

The receiving sleeve 48 of each storage tray 30 is formed with an aperture 52 for receiving shaft 50. The receiving sleeve 48 includes an upper rim 54 and a lower rim 56 that contact adjacent components of the tackle box. For example, in the embodiment of the tackle box depicted in FIG. 1A, the upper rim 54 of an upper storage tray rests against the lower rim 34 of the cover, the lower rim 56 of the upper storage tray rests against the upper rim 54 of a lower storage tray, and so on until the lower rim 56 of the lowest storage tray rests against the upper rim of the bottom tray 40. In a preferred embodiment, rims 54 and 56 include a friction surface, preferably a toothed surface, that mates with a complementary surface on an adjacent cover or tray to fix the respective positions of the trays when the friction surfaces are compressed together.

The storage tray 30 preferably includes a rib 58 to assist in the alignment of the storage tray with other storage trays or the bottom tray. The rib 58 extends downwardly from the floor 44 around the tray's circular periphery, and is recessed inwardly from the periphery so that the outer surface of the rib 58 is in slideable communication with the inner surface of the peripheral sidewall of the bottom tray 40 when the tray 30 is vertically stacked on the bottom tray. For embodiments of the tackle box having more than one storage tray, the outward surface of the rib 58 of the storage tray is in slideable communication with the inward surface of the peripheral sidewall 46 of the storage tray on which it is stacked.

In a preferred embodiment, storage tray 30 further includes a brake tab (not shown) that limits the rotation of the tray with respect to the tray located immediately below the storage tray. The brake tab allows the storage tray to rotate through an arc defined by the bottom tray's radial divider walls. For embodiments of the tackle box having more than one vertically stacked storage trays, the brake tab restrains the rotation of an upper storage tray to an arc defined by the radial sidewalls 47 of a lower storage tray.

Storage tray 30 optionally includes one or more divider walls formed integrally with the tray to partition the tray into multiple compartments. For example, referring to FIG. 2, five divider walls 62 extend generally parallel with one of the radial sidewalls 47 and partition the storage tray 30 into six compartments. The compartments are further subdivided by removable partitions 51 which fit into slots formed in the divider walls 62. The partitions may be added or removed by a user to change the size of the compartments.

Divider walls 62 are formed with notches 53 that permit the passage of the brake tab 38 of the cover 20, or for tackle box embodiments having more than one storage tray, the brake tab of another storage tray. It will be appreciated that the storage tray 30 may be partitioned into a number of compartments of various sizes and shapes by a multitude of divider walls. One or more of the compartments of tray 30 may also be lined with removable box-shaped inserts (not shown). The inserts may be placed in the compartments to hold items, or removed from the tray to access items contained in the inserts.

The bottom tray 40 has a generally circular periphery having a radius substantially equivalent to the radii of the cover 20 and the storage trays 30. Bottom tray 40 has a substantially flat floor 72 and a peripheral sidewall 74 integrally connected to and upwardly extending from the floor. Bottom tray 40 also includes a hollow pedestal 76 centered on the upper surface of the floor 72. As described in additional detail below, the pedestal 76 is used to attach the shaft 50 to the bottom tray 40 in the tackle box. The bottom tray 40 includes two substantially perpendicular divider walls 78 which extend radially from the pedestal 76 to the peripheral sidewall 74. The perpendicular divider walls have a height substantially equivalent to sidewall 74.

Figure 5:
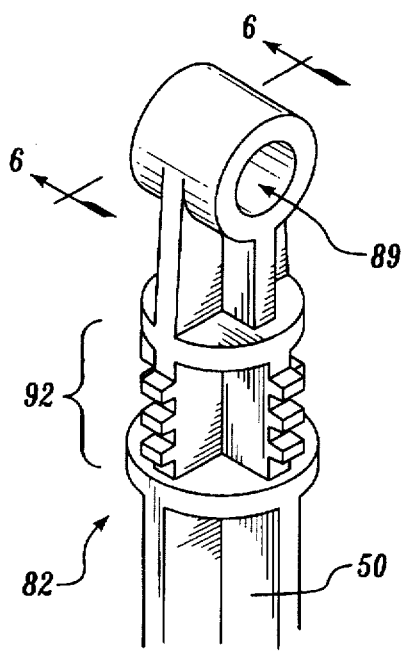
FIG. 5 is a perspective view of an upper end of the central shaft having a threaded section for receipt of a wing nut.
Figure 6:
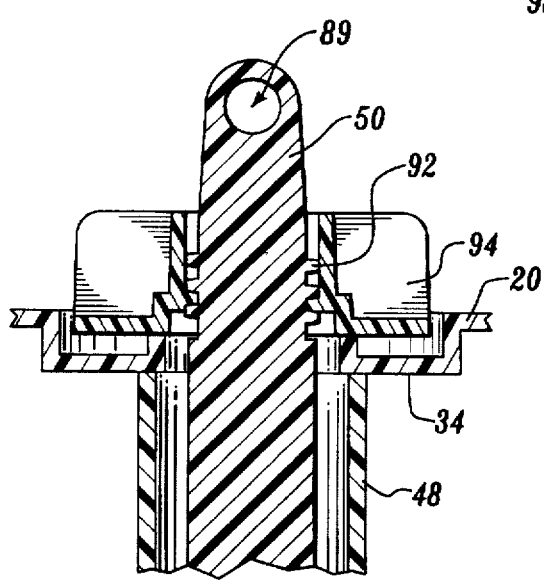
FIG. 6 is a cross section of the upper end of the central shaft with the wing nut affixed to the shaft.
Figure 7:
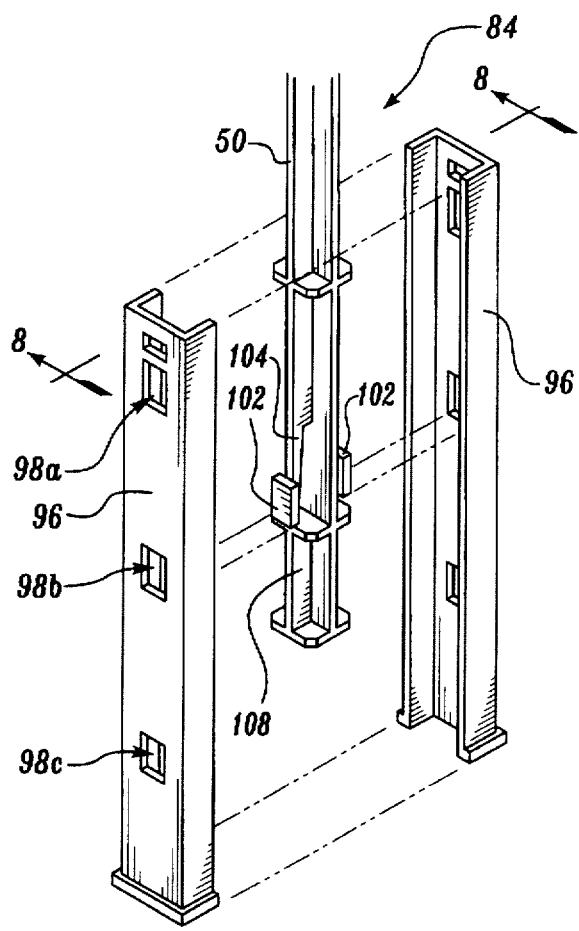
FIG. 7 is an exploded perspective view depicting a lower end of the central shaft and a shaft receiving means affixed to the bottom tray.
Figure 8:
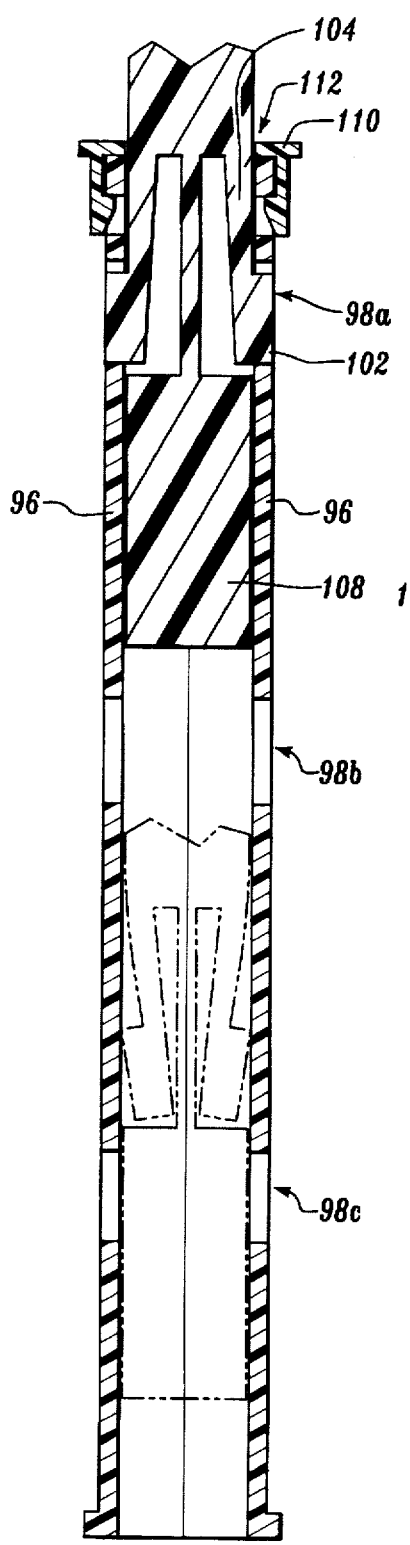
FIG. 8 is a cross section of the lower end of the central shaft and the shaft receiving means.

The cover and storage tray or trays of the tackle box are rotatably mounted to the bottom tray by the central shaft 50. The shaft 50 includes an upper end 82, as depicted in FIGS. 5 and 6, and a lower end 84 as depicted in FIGS. 7 and 8. The upper end 82 includes a means for securing the shaft 50 to the cover 20. A threaded section 92 of the shaft allows a complementary threaded wing nut 94 to be attached to the shaft. When threaded on the shaft, the wing nut 94 abuts the cover 20 as depicted in the cross section of FIG. 6. The downward tightening of the wing nut 94 compresses the cover 20, the storage tray or trays 30, and the bottom tray 40, thereby locking the cover and the storage tray or trays in a fixed nonrotatable position. Conversely, the loosening of the wing nut 94 allows the cover 20 and the storage tray or trays 30 to rotate about the shaft 50.

In a preferred embodiment, the upper end 82 of the central shaft includes a handle 86 that is affixed to the shaft 50 by a pin 88 passing through a hole 89 in the shaft. The wing nut 94 is placed on the shaft prior to the attachment of the handle to the central shaft. Because the size of the handle is larger than the threaded hole of the wing nut, the handle prevents the wing nut from becoming detached and separated from the tackle box. The pin 88 is loosely fitted to allow the handle to rotate between a position in which the handle is flat against the cover 20, and a position in which the handle extends upwardly to allow the tackle box to be grasped by a user.

The lower end 84 of the shaft 50 includes a means for attaching the shaft to the bottom tray 40. With reference to FIGS. 7 and 8, in one embodiment, the shaft receiving means of the bottom tray 40 includes a pair of sleeves 96 having one or more opposing pairs of slots 98a, 98b, and 98c for receiving the lower end of the shaft. The pair of sleeves 96 are inserted into and fixed by the pedestal 76 in the floor of the bottom tray. The lower end 84 of the shaft 50 includes a pair of tabs 102 attached to resilient arms 104. The resiliency of the arms 104 allows the tabs 102 to be depressed so as to be slideable within the pair of sleeves 96, and to spring into an opposing pair of slots when positioned so that the tabs coincide with the slots. The insertion of the tabs into a pair of slots locks the lower end of the shaft to the bottom tray.

In a preferred embodiment, the sleeves 96 include more than a single pair of opposing slots 98a, 98b, 98c, thus making the tackle box adjustable in height. The vertical distance between opposing pairs of slots on sleeves 96 corresponds to the height of a storage tray 30. Accordingly, the vertical position of the shaft 50 in the sleeves 96 defines the number of storage trays 30 present in a representative tackle box of this invention. For a tackle box having three storage trays 30, tabs 102 of shaft 50 are inserted into the lowermost pair of slots 98a. For a tackle box having four storage trays, tabs 102 are inserted into the central pair of slots 98b, and for a tackle box having five storage trays, tabs 102 are inserted into the uppermost pair slots 98c. The sleeves therefore allow three to five storage trays 30 to be incorporated in the tackle box with a single length shaft 50. It will be appreciated, however, that tackle boxes having shafts of different lengths and sleeves having more or less than three opposing pairs of slots may be constructed so as to allow the tackle box to incorporate a greater or lesser number of storage trays and trays having different vertical heights.

Referring again to FIG. 7, in a preferred embodiment of the tackle box the lower end 84 of the shaft 50 includes an extended foot 108 for centering the shaft in the channel formed by the sleeves. The sleeves 96 are also capped by a collar 110. The collar 110 is formed with a hole 112 having the same diameter as the central shaft 50 to secure the shaft and prevent lateral motion of the bottom of the shaft.

While a specific construction is depicted for attaching the shaft to the cover and the bottom tray, it will be appreciated that any construction may be used to secure the components together. The lower end 84 of the shaft may be attached to the bottom tray 40 so that the end of the shaft is fixed, or so that the end of the shaft is free to rotate. A hole may be formed in the bottom tray to allow the shaft to be fixed on the outside of the bottom tray. Similarly, the upper end 82 of the shaft 50 may be secured to cover 20 by any one of a number of means.

Returning to FIG. 2, the tackle box is assembled by inserting the sleeves 96 into the pedestal 76 and locking the sleeves together with the collar 110. The shaft 50 is then fixed to the bottom tray 40 by inserting the tabs 102 on the shaft into a pair of opposing slots 98a, 98b, or 98c on the sleeves 96. Storage trays 30 are then mounted on shaft 50 by sliding the shaft through the aperture 52 of the receiving sleeve 48. The initial storage tray is positioned on the bottom tray 40 so that the brake tab 38 for the second storage tray 30 resides within the approximately three-quarter cylindrical compartment of the bottom tray defined by the divider walls 78. Similarly, for embodiments having a second storage tray, the second storage tray is positioned on the first storage tray so that the brake tab 60 resides within the three-quarter cylindrical compartment. The rotatable cover 20 is then mounted on the shaft 50 by sliding the shaft through the aperture 28 of the receiving sleeve 26, and positioning the cover on the top storage tray so that the brake tab 38 resides within the storage tray. Finally, the wing nut 94 is tightened on the threaded section 92 of the shaft 50. The handle 86 is then attached to the shaft 50 by pin 88 to complete the tackle box assembly.

Figure 9:
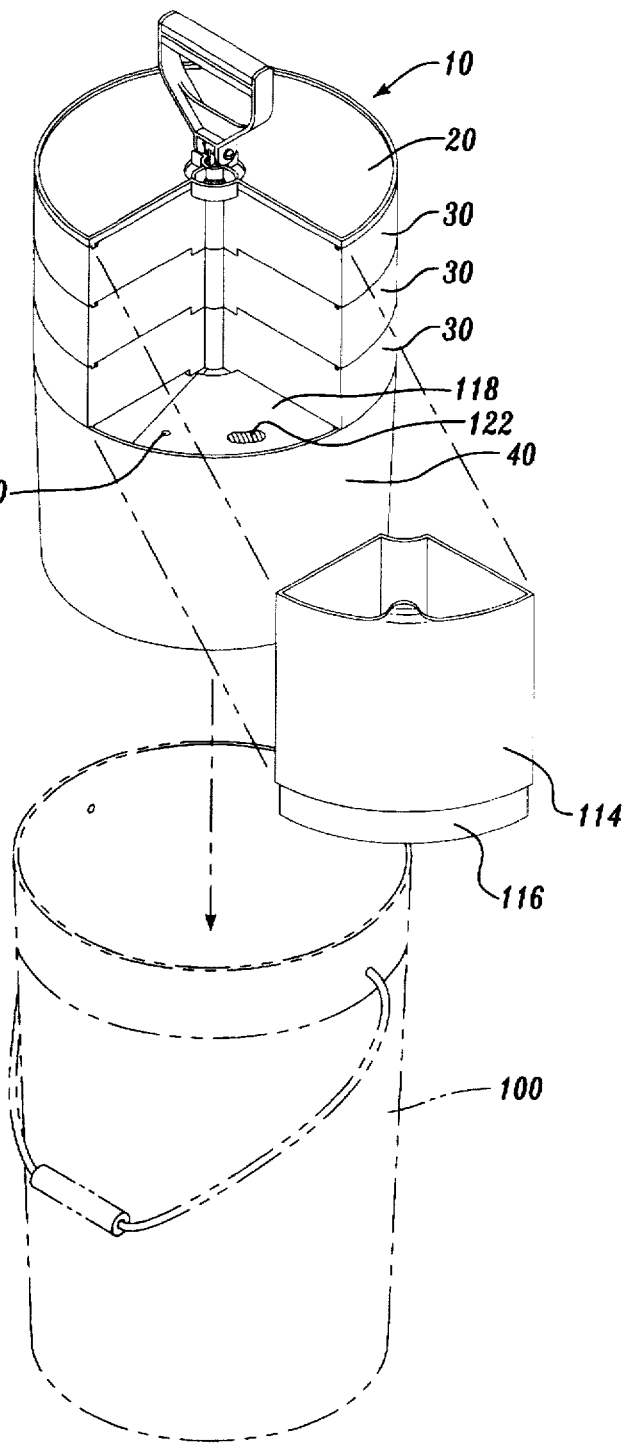
FIG. 9 is a perspective view depicting the insertion of the tackle box into a bucket and a bait container that may be added to the tackle box.

The tackle box of this invention is a self-contained tackle box, requiring no additional supporting structure. The sidewalls of the bottom tray 40 and the storage tray or trays 30 form a substantially continuous surface which, in combination with the bottom tray floor and the cover, define the exterior of the tackle box. As depicted in FIG. 9, the entire tackle box is preferably sized so that the outer diameter of the tackle box is equal to the inner diameter of a five or six gallon bucket 100. The tackle box therefore fits within the bucket for convenient transport to fishing locations.

The tackle box may be constructed from a variety of materials, including plastic materials such as polypropylene and acrylic plastics. Preferably, the trays are constructed of a transparent plastic, for example, clear acrylic, to allow a visual identification of the contents of each tray from the exterior of the tackle box. It will be appreciated that stiffening ribs or other bracing may be incorporated in the tackle box components to provide any necessary structural support.

As noted above, the tackle box 10 of the present invention is generally cylindrical in shape having a quarter-cylindrical portion deleted from the storage trays and cover. The deleted portion may be occupied by an additional quarter-cylindrical shaped compartment that substantially fills the deleted portion of the tackle box. For example, a removable bait container 114 is depicted in FIG. 9 as filling the deleted portion of the tackle box. The bait container 114 is a quarter-cylindrical compartment that substantially fills the deleted portion of the storage tray or trays and cover. The bait container includes an extended base 116 that is sized to fit within the bottom tray 40 and secure the bait container to the tackle box.

Instead of a bait container, the deleted portion may also be filled with an intermediate cover 118. As depicted in FIG. 9, the intermediate cover 118 is incorporated in the tackle box 10 immediately above the bottom tray 40 and below the lowest storage tray 30. The intermediate cover 118 includes a central shaft receiving sleeve (not shown), that allows the cover to rotate around the shaft 50. Preferably, the intermediate cover 118 is sized to be slightly larger than the deleted portion so that when closed, the cover prevents water or other objects from entering the bottom tray. When the intermediate cover is closed, a dimple 120 in the cover mates with a corresponding protrusion (not shown) from the lower surface of the lowest storage tray. The dimple and protrusion thereby secures the cover from being inadvertently opened during transport. To allow the cover to be easily opened, a textured pad 122 is provided for a user's finger on the upper surface of the cover. As with the other components of the tackle box 10, the intermediate cover may be removed and replaced as desired by the user.

Figure 10:
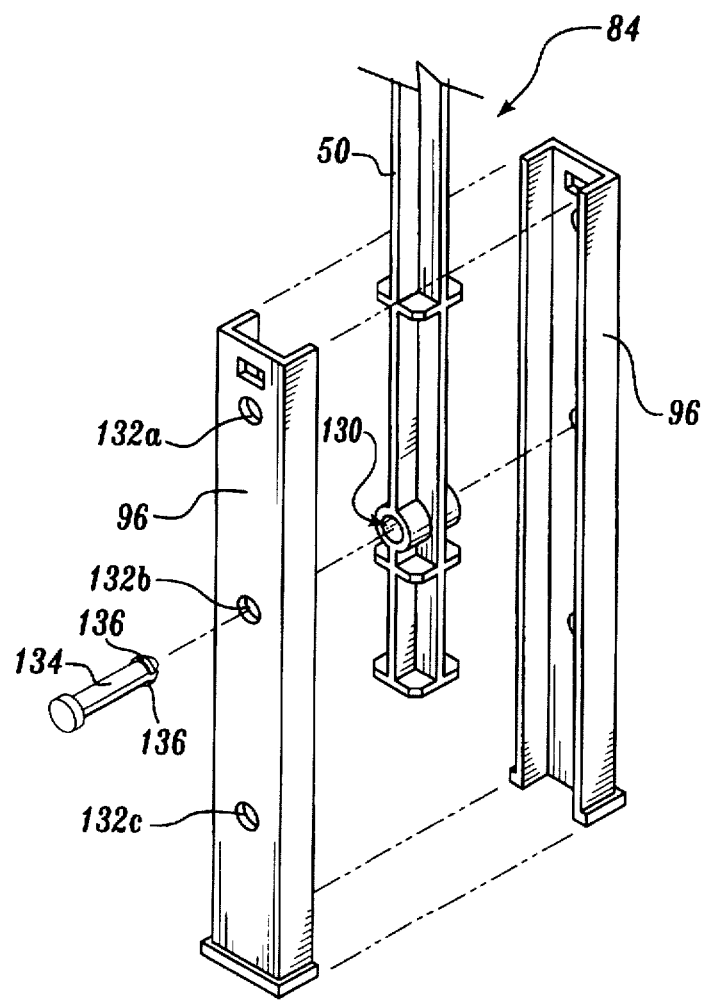
FIG. 10 is an exploded perspective view depicting a second embodiment of a lower end of the central shaft and a shaft receiving means affixed to the bottom tray.

While the preferred embodiment of the invention has been illustrated and described, it will be apparent that various changes can be made therein without departing from the spirit and scope of the invention. For example, other constructions may be envisioned for selectively connecting the shaft 50 to the bottom tray 40. A second embodiment of a means for attaching the shaft to the bottom tray is depicted in FIG. 10. Instead of resilient arms, the lower end 84 of the central shaft 50 is formed with a hole 130 that extends transversely through the shaft. Each of the pair of sleeves 96 is formed with one or more opposing pairs of holes 132a, 132b, and 132c. To fix the location of the shaft with respect to the pair of sleeves, a pin 134 is inserted through one of the pairs of holes 132a, 132b, and 132c, through the hole 130 of the shaft, and through the corresponding other of the pairs of holes 132a, 132b, and 132c. The pin 134 includes a slot which divides the pin into two members, each member formed with a flange 136. When fully inserted through both sleeves, the flanges 136 on the members extend beyond the hole in the sleeve and lock the pin in place. To remove the pin 134 and reposition the shaft 50, the user pinches the two members together so that the flanges fit through the pairs of holes in the sleeves. Those skilled in the art will appreciate that to allow the pin 134 to be inserted through the center shaft 50, the divider walls 78 in the bottom tray 40 must be removed or omitted from the tackle box.

Moreover, while the preferred use of the tackle box is for storing fishing lures and other equipment, it will also be appreciated that the disclose tackle box is suitable for storing a variety of items. The size and number of the compartments in each storage tray may be varied depending on the size and type of item to be stored in the tackle box. For example, the tackle box may be readily adapted for storing sewing supplies by providing compartments sized to hold scissors, thread, and other sewing accessories. Consequently, within the scope of the appended claims it will be appreciated that the invention can be practiced otherwise than as specifically described herein.

The embodiments of the invention in which an exclusive property or privilege is claimed are defined as follows:

1. A storage container comprising:
   (a) a bottom tray having a generally circular periphery, a floor, a peripheral side wall extending upwardly from the floor around the periphery and defining an internal portion therein, and a shaft receiving means centered on the floor;
   (b) a first storage tray located over the bottom tray and having a circular periphery, a floor that provides at least a partial cover for the bottom tray, a peripheral side wall extending upwardly from the floor around the periphery, a central shaft receiving sleeve, a first hole through the floor providing access to the internal portion of the bottom tray, and sidewalls extending upwardly around at least a portion of the first hole;
   (c) a second storage tray located over the first tray and having a circular periphery with a floor that provides at least a partial cover for the first tray, a peripheral side wall extending upwardly from the floor around the periphery, a central shaft receiving sleeve, a second hole through the floor providing access to the first tray, and sidewalls extending upwardly around at least a portion of the second hole;

9

(d) a cover having a circular periphery and a third hole therein and a central shaft receiving sleeve;

(e) a central shaft coupled to the shaft receiving means and extending through the shaft receiving sleeve of the storage tray and the shaft receiving sleeve of the cover, the ventral shaft allowing the first and second storage trays and the cover to rotate around an axis defined by the central shaft so that the first, second, and third holes can be selectively aligned to provide access through the first, second, and third holes to the internal portion of the bottom tray; and (f) a locking mechanism to selectively restrict rotation of the first and second storage trays and the cover around the axis defined by the central shaft.

2. The storage container of claim 1, wherein the peripheral sidewalls of the storage tray and bottom tray form an exterior surface of the storage container.

3. The storage container of claim 1, wherein the locking mechanism comprises a wing nut sized to engage an upper end of the central shaft, wherein tightening the wing nut compresses the cover, storage tray, with the bottom tray to prevent the storage tray and the cover from rotating around the axis defined by the central shaft and loosening the wing nut releases the cover and storage tray so that the cover and storage tray may rotate around the axis defined by the central shaft.

4. The storage container of claim 3, wherein an upper rim and a lower rim of the central shaft receiving sleeve of the storage tray comprises a friction surface.

5. The storage container of claim 4, wherein a lower rim of the central shaft receiving sleeve of the cover comprises a friction surface.

6. The storage container of claim 1, further comprising a plurality of storage trays with holes, the central shaft fixing the plurality of storage trays in a vertical stack between the cover and the bottom tray.

7. The storage container of claim 1, further comprising a handle attached to the central shaft.

8. The storage container of claim 7, wherein the handle rotates between an extended position where the handle is graspable by a user, and a folded position in which the handle is flush with the cover of the storage container.

9. The storage container of claim 1, wherein the storage tray further comprises a brake for limiting the rotation of the storage tray around the central shaft.

10. The storage container of claim 1, wherein the cover further comprises a brake for limiting the rotation of the cover around the central shaft.

11. A storage container having a selectable number of storage trays, the storage container comprising:

(a) a bottom tray having a generally circular periphery, a floor, a peripheral side wall extending upwardly from the floor around the periphery and defining an internal portion therein, and a shaft receiving means centered on the floor;

(b) a plurality of storage trays, each of the plurality of storage trays having a circular periphery, a floor, a peripheral side wall extending upwardly from the floor around the periphery, a central shaft receiving sleeve, a hole through the floor, and sidewalls extending around at least a portion of the hole;

(c) a cover having a circular periphery, a hole therethrough and a central shaft receiving sleeve; and (d) a shaft coupled to the shaft receiving means and extending through the shaft receiving sleeves of the plurality of storage trays and the shaft receiving sleeve of the cover to allow the storage tray and the cover to rotate around an axis defined by the shaft, a coupling point between the shaft and the shaft receiving means being adjustable to select a number of the plurality of storage trays that are incorporated in the storage container.

12. The storage container of claim 11, wherein the shaft receiving means comprises a tubular member formed with a plurality of holes spaced along the length of the tubular member.

13. The storage container of claim 12, wherein the shaft comprises:

(a) a body;

(b) a flexible arm mounted to the body; and (c) a tab extending from the flexible arm and sized to fit within one of the plurality of holes in the tubular member when the shaft is inserted into the tubular member, the coupling point between the shaft receiving means and the shaft determined by the one of the plurality of holes in the tubular member into which the tab is inserted.

14. The storage container of claim 12, further comprising a second flexible arm mounted to the body and a second tab extending from the second flexible arm and sized to fit within another of the plurality of holes in the tubular member when the shaft is inserted into the tubular member.

15. The storage container of claim 14, wherein the first tab is diametrically opposed from the second tab.

16. The storage container of claim 12, wherein the plurality of holes are spaced apart on the tubular member at a distance equal to a height of one of the plurality of storage trays.

17. The storage container of claim 12, wherein the shaft comprises a body formed with a hole.

18. The storage container of claim 17, further comprising a pin sized to fit through one of the plurality of holes in the tubular member, through the hole in the shaft, and thorough another one of the plurality of holes in the tubular member when the shaft is inserted into the tubular member, the coupling point between the shaft receiving means and the shaft determined by the one of the plurality of holes in the tubular member into which the pin is inserted.

19. The storage container of claim 18, wherein the plurality of holes are spaced apart on the tubular member at a distance equal to a height of one of the plurality of storage trays.

20. A storage container comprising:

(a) a bottom tray having a generally circular periphery, a floor, a peripheral side wall extending upwardly from the floor around the periphery and defining an internal portion therein, and a shaft receiving means centered on the floor;

(b) a storage tray located over the bottom tray and having a circular periphery, a floor that provides at least a partial cover for the bottom tray, a peripheral side wall extending upwardly from the floor around the periphery, a central shaft receiving sleeve, a first hole through the floor providing access to the internal portion of the bottom tray, and sidewalls extending upwardly around at least a portion of the first hole;

(c) a cover having a circular periphery and a second hole therethrough and a central shaft receiving sleeve;

(d) a central shaft coupled to the shaft receiving means and extending through the shaft receiving sleeve of the storage tray and the shaft receiving sleeve of the cover, the central shaft allowing the storage tray and the cover to rotate around an axis defined by the central shaft so that the first and second holes can be selectively aligned so as to provide access through the first and second holes to the internal portion of the bottom tray; and (e) a brake for limiting rotation of the storage tray around the central shaft.

21. A storage container comprising:

(a) a bottom tray having a generally circular periphery, a floor, a peripheral side wall extending upwardly from the floor around the periphery and defining an internal portion therein, and a shaft receiving means centered on the floor;

(b) a storage tray located over the bottom tray and having a circular periphery, a floor that provides at least a partial cover for the bottom tray, a peripheral side wall extending upwardly from the floor around the periphery, a central shaft receiving sleeve, a first hole through the floor providing access to the internal portion of the bottom tray, and sidewalls extending upwardly around at least a portion of the first hole;

(c) a cover having a circular periphery and a second hole therethrough and a central shaft receiving sleeve;

(d) a central shaft coupled to the shaft receiving means and extending through the shaft receiving sleeve of the storage tray and the shaft receiving sleeve of the cover, the central shaft allowing the storage tray and the cover to rotate around an axis defined by the central shaft so that the first and second holes can be selectively aligned so as to provide access through the first and second holes to the internal portion of the bottom tray; and (e) a brake for limiting rotation of the cover around the central shaft.

* * * * *

UNITED STATES PATENT AND TRADEMARK OFFICE
CERTIFICATE OF CORRECTION

PATENT NO. : 5,799,787
DATED : September 1, 1998
INVENTOR(S) : D.P. Talbot

It is certified that error appears in the above-identified patent and that said Letters Patent is hereby corrected as shown below:

| COLUMN | LINE | |
|---|---|---|
| 9 (Claim 1, | 6 line 28) | "ventral" should read --central-- |
| 10 (Claim 14, | 22 line 1) | "12" should read --13-- |
| 10 (Claim 16, | 29 line 1) | "12" should read --13-- |

Signed and Sealed this

Twenty-ninth Day of December, 1998

Attest:

BRUCE LEHMAN

Attesting Officer      Commissioner of Patents and Trademarks